(12) United States Patent
Medlege et al.

(10) Patent No.: US 9,673,480 B2
(45) Date of Patent: Jun. 6, 2017

(54) BINDER FOR AN ELECTRODE OF AN ELECTROCHEMICAL SYSTEM, ELECTRODE COMPRISING THIS BINDER, AND ELECTROCHEMICAL SYSTEM COMPRISING THIS ELECTRODE

(75) Inventors: Franck Medlege, Grenoble (FR); Helene Rouault, Le Versoud (FR); Naceur Belgacem, Brie et Angonnes (FR); Anne Blayo, St Martin d'Heres (FR)

(73) Assignees: INSTITUT NATIONAL POLYTECHNIQUE DE GRENOBLE, Grenoble (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1456 days.

(21) Appl. No.: 12/526,190

(22) PCT Filed: Feb. 8, 2008

(86) PCT No.: PCT/EP2008/051574
§ 371 (c)(1),
(2), (4) Date: Aug. 6, 2009

(87) PCT Pub. No.: WO2008/101823
PCT Pub. Date: Aug. 28, 2008

(65) Prior Publication Data
US 2010/0092871 A1 Apr. 15, 2010

(30) Foreign Application Priority Data
Feb. 9, 2007 (FR) ...................... 07 53170

(51) Int. Cl.
H01M 10/0525 (2010.01)
H01M 4/139 (2010.01)
H01M 4/62 (2006.01)

(52) U.S. Cl.
CPC ....... *H01M 10/0525* (2013.01); *H01M 4/139* (2013.01); *H01M 4/621* (2013.01);
(Continued)

(58) Field of Classification Search
None
See application file for complete search history.

(56) References Cited

U.S. PATENT DOCUMENTS 4,262,067 A * 4/1981 Philipp et al. ............... 429/139
5,246,796 A 9/1993 Nagamine et al.
(Continued)

FOREIGN PATENT DOCUMENTS

EP 0 492 586 A2 7/1992
EP 0 606 533 A2 7/1994
(Continued)

OTHER PUBLICATIONS

International Search Report for PCT/EP2008/051574 dated May 9, 2008.
French Search Report dated Nov. 2, 2007.

*Primary Examiner* — Yoshitoshi Takeuchi
(74) *Attorney, Agent, or Firm* — Pearne & Gordon, LLP (57) ABSTRACT

Binder for an electrode of an electrochemical system having a non-aqueous electrolyte, said binder comprising a first polymer which has functional groups capable of reacting with a crosslinking agent and is crosslinked with said crosslinking agent, the crosslinked first polymer forming a three-dimensional network in which a second polymer chosen from fluoropolymers is imprisoned.

34 Claims, 2 Drawing Sheets

(52) U.S. Cl.
CPC ............ *H01M 4/622* (2013.01); *H01M 4/623* (2013.01); *Y02E 60/122* (2013.01)

(56) References Cited

U.S. PATENT DOCUMENTS

| | | |
|---|---|---|
| 6,183,907 B1 | 2/2001 | Barusseau et al. |
| 6,455,202 B1 | 9/2002 | Marugan et al. |
| 6,544,688 B1 * | 4/2003 | Cheng .......................... 429/245 |
| 7,396,880 B2 | 7/2008 | Goldbach et al. |
| 7,815,986 B2 | 10/2010 | Goldbach et al. |

FOREIGN PATENT DOCUMENTS

| | | | |
|---|---|---|---|
| EP | 1 715 536 A2 | 10/2006 | |
| FR | 2 766 969 A1 | 2/1999 | |
| FR | 2 790 330 A1 | 9/2000 | |
| GB | EP 1715536 * | 10/2006 | .............. H01M 4/24 |
| JP | 2002-216769 A | 8/2002 | |
| JP | 2002-246029 A | 8/2002 | |
| JP | WO 02/073720 * | 9/2002 | .............. H01M 4/62 |
| WO | 02/073720 A2 | 9/2002 | |
| WO | 2006/127309 A2 | 11/2006 | |

\* cited by examiner

BINDER FOR AN ELECTRODE OF AN ELECTROCHEMICAL SYSTEM, ELECTRODE COMPRISING THIS BINDER, AND ELECTROCHEMICAL SYSTEM COMPRISING THIS ELECTRODE

TECHNICAL FIELD

The invention relates to a binder for the electrodes of electrochemical systems having a non-aqueous electrolyte.

In particular, the invention relates to a binder for the electrodes of rechargeable electrochemical accumulators having an organic electrolyte, especially for lithium batteries.

The invention furthermore relates to an electrode comprising this binder.

The invention also relates to an electrochemical composition having a non-aqueous electrolyte comprising said electrode.

The invention also relates to a rechargeable electrochemical accumulator having a non-aqueous electrolyte comprising a positive electrode and a negative electrode comprising said binder, and a non-aqueous electrolyte.

Finally, the invention relates to a method of preparing an electrode comprising said binder.

The technical field of the invention may be defined in general as that of electrodes employed in electrochemical compositions having a non-aqueous organic electrolyte and more particularly as that of rechargeable accumulators having an organic electrolyte, such as lithium accumulators or batteries.

The electrodes of rechargeable accumulators having a conventional organic electrolyte contain an electrochemically active material which constitutes a receiving structure into which the cations, for example lithium cations, are inserted, and from which said cations are removed, during cycling. Each electrode is obtained by depositing an ink or paste on a current collector, said ink or paste containing the active material, optionally conductive additives, a polymer binder and a solvent.

The purpose of using a polymer binder for manufacturing the electrode is firstly to ensure cohesion of the active material, which is in pulverulent form, without substantially masking the electrochemically active surface. This effect depends on the wetting properties of the binder. Good bonding to the active material is generally guaranteed by the existence, in the polymer binder, of groups giving rise to chemical bonds or hydrogen bonds, such as hydroxyl, carboxyl or amide groups. However, a compromise has to be found as too strong an interaction of the binder with the active material results in the particles of active material being excessively covered, which lowers the exposed active surface area and consequently the capacity.

The binder must also allow the ink to adhere to the current collector, the adhesion also being guaranteed by the presence of polar groups in the polymer.

In addition, the polymer binder must give the electrode sufficient flexibility for it to be handled, in particular for withstanding the coiling step in the case of a cylindrical accumulator arrangement.

The polymer binder must also follow the dimensional variations of the active material during charge and discharge cycles.

The polymer binder must also be provided with certain electrochemical properties.

In particular, it must be compatible with the electrolytes used.

Finally, since the reducing agents and oxidizing agents used as active materials are very powerful, the binder must have the lowest possible reactivity so as to be capable of withstanding, without being degraded, extreme operating conditions.

It therefore appears to be difficult using a single polymer binder to fulfil all these objectives.

In addition, to be used successfully on printing equipment and in particular to ensure roll-to-roll transfer, the paste or ink intended for preparing the electrode must possess precise rheological and physico-chemical properties dependent on the type of press envisaged for producing the electrodes.

In particular, the surface tension of the ink, and more particularly the polar component of the surface energy must be perfectly controlled.

In conventional rechargeable lithium accumulators, it is common practice to use, as binder, a polymer such as polytetrafluoroethylene (PTFE) which possesses excellent stability in the electrolyte. However, the non-stick properties of PTFE prevent the use of a thin conductive support, such as a foil, essential for obtaining high energy densities (volume). In addition, the stability of PTFE with respect to powerful reducing agents is low because of the presence of many fluorine atoms.

Document EP-A2-0 492 586 discloses a rechargeable accumulator having a non-aqueous electrolyte.

At least one of the positive and negative electrodes contains a binder in its solvent, an electrochemically active material and, optionally, electronically conductive additives, the whole being coated on a thin metal current collector support.

A pulverulent (powder) mixture, comprising the active material in powder form and optionally conductive additives, is thus prepared. The pulverulent mixture is then dispersed in the binder consisting of polyvinylidene fluoride (PVDF) dissolved in an organic solvent, such as N-vinylpyrolidone. The whole constitutes a thick suspension, or paste, and this suspension or paste or ink, which therefore comprises in particular the active material and the polymer binder, is then applied to an electrode collector formed by a metal foil, such as a thin copper or aluminium foil.

The suspension is then dried so as to remove the solvent.

In the case of the negative electrode, the active material is a carbon-based material and the electrode collector is formed by a copper foil, for example 20 μm in thickness.

In the case of the positive electrode, the active material is in particular $LiCoO_2$, the electrode mixture may furthermore include a conductive agent, such as graphite and the current collector generally consists of an aluminium foil, for example 80 μm in thickness.

The mechanical and electrochemical properties of PVDF allow a good compromise between the numerous objectives explained above to be achieved. However, its adhesion to the collector metals, namely the foils, remains poor because of the low polar component of the surface tension of PVDF, and therefore adhesion promoters have to be added since otherwise the carbon powder would become detached from the collector metal, such as the copper sheet or foil, thereby progressively reducing the capacity of the accumulator. Accumulators using PVDF therefore have short lifetimes.

Furthermore, when the temperature of the accumulator rises as a result of short circuits or similar incidents, PVDF decomposes, giving off HF which reacts violently in an exothermic manner with the compounds formed on the negative electrode during the charge, so that the accumulator can break or explode.

Document EP-A2-0 606 533 discloses rechargeable accumulators in which the negative electrode comprises carbon powder, the particles of which are consolidated by a binder, which is a polyimide (PI) resin or a polyvinyl formal (PVF) resin. A solution of PI or PVF in an organic solvent, such as NMP, is mixed with a carbon powder and, if necessary, with a conductive agent for preparing a suspension or paste. This paste is applied to a metal current collector using a doctor blade, the suspension is dried on the metal of the collector so as to remove the solvent, and then the resin is cured by heating to high temperature, for example to 350° C. in the case of a PI resin.

These binders make it possible to obtain a good compromise between the electrochemical and mechanical properties, however polyimides are expensive polymers.

Elastomers such as the terpolymer ethylene/propylene/diene monomer (EPDM) known for its high chemical resistance, a styrene/butadiene (SBR) latex, an acrylonitrile/butadiene (NBR) latex and SIS or SBS block copolymers confer excellent mechanical properties on the electrode but give rise to large capacity losses during cycles.

Polymers having the advantage of avoiding the use of harmful organic solvents are those of the latex family, which comprises a large number of copolymers in aqueous emulsion that are not listed above.

More recently, all of the copolymers of the latex family have thus been used in combination with a thickener, especially of the family of cellulose derivatives, namely CMC (carboxymethylcellulose) and HMC (hydroxymethylcellulose), in the form of emulsions in aqueous medium.

Therefore document FR-A-2 766 969 discloses a binder for an electrode of an electrochemical system having a non-aqueous electrolyte, which contains acrylnitrile-butadiene rubber and carboxymethylcellulose. Overall, the adhesion of the binder and the mechanical and electrochemical properties of the anodes (negative electrodes) described in that document are satisfactory. However, the binders using these polymers come up against their limits in the manufacture of cathodes (positive electrodes), which cannot give good electrochemical performance. Furthermore, latex-type polymers are employed in aqueous solvents, resulting in corrosion of the current collectors, for example aluminium, by water. To remedy this problem, document FR-A-2 790 330 provides in the case of the use of a binder dissolved or suspended in water, to cover the surface of the current collector with a protective layer supposed to prevent any corrosion. The current collectors thus treated allow good electrochemical properties to be obtained.

Likewise, blends of polymers having complementary properties have been proposed as electrode binder, for example blends of a polymer belonging to the family of non-fluorinated elastomers, giving the electrode flexibility, and of a polymer capable of bonding strongly to the active material. The main drawback of these blends is, on the one hand, the difficulty in obtaining a homogeneous paste, because of the incompatibility of the constituents and, on the other hand, the difficulty of predicting the distribution of the binders in the final electrode, the various components having different solubility or coagulation properties during the solvent removal step. Specifically, these blends often give rise to the phenomenon of demixing during drying.

It has therefore been found, with regard to the above, that none of the binders disclosed, whether binders comprising a single polymer or binders comprising several polymers, meets all the criteria and requirements mentioned above for such a binder and fail to achieve all the abovementioned objectives.

There is therefore a need for a binder for an electrode of an electrochemical system that allows all these objectives to be achieved and which meets all the requirements and criteria listed above.

In particular, a need exists for such a binder that can be applied easily in the form of a paste or ink which can be used in any transfer or printing device.

A need also exists for such a binder for manufacturing electrodes that are flexible and resistant, that adhere perfectly to the current collectors and that have excellent electrochemical and mechanical properties.

Finally, a need exists for a binder that does not cause any corrosion or toxicity problems and is not expensive.

One aim of the present invention is to provide a binder for an electrode of an electrochemical system which satisfies inter alia these needs and which in particular meets the abovementioned requirements and criteria.

Another aim of the present invention is to provide a binder for an electrode of an electrochemical system which does not have the drawbacks, defects, limitations and disadvantages of the binders of the prior art and which solves the problems of the binders of the prior art.

These aims, as well as other ones, are achieved, in accordance with the invention, by a binder for an electrode of an electrochemical system having a non-aqueous electrolyte, said binder comprising a first polymer which has functional groups capable of reacting with a crosslinking agent, and is crosslinked with a crosslinking agent, the crosslinked first polymer forming a three-dimensional network in which a second polymer chosen from fluoropolymers is imprisoned.

The binder according to the invention comprises the combination of two specific polymers, each of which provides complementary characteristic properties.

A binder comprising the combination of the two specific polymers according to the invention has not been described previously.

The association of these two polymers in a binder creates a true synergy, resulting simultaneously in a set of properties that has never been found hitherto for binders, in particular for binders comprising two polymers.

The binder according to the invention meets all the needs, mentioned above, satisfies all the abovementioned criteria and requirements and solves the problems presented by the binders of the prior art.

One of the polymers is a fluoropolymer, whereas the other polymer is a polymer comprising functional groups capable of reacting with a crosslinking agent, for example hydroxyl functional groups.

The first polymer may thus be defined for example as a hydroxylated polymer, especially a highly hydroxylated one.

This first polymer may thus have an ester number of between 8 and 200 mg (±5 to 20 mg respectively) of KOH per gram of polymer.

According to the invention, the blend of these two polymers is, surprisingly, thermodynamically stable, that is to say it is permanently homogeneous and undergoes no demixing during the step of drying the deposited paste or ink. According to the invention, this thermodynamic stability is due to the fact that the first polymer, for example a hydroxylated polymer, is in the form of a three-dimensional network obtained by a crosslinking reaction between a crosslinking agent and the functional groups capable of reacting with this agent that are carried by the first polymer, and the fact that the second fluoropolymer is entangled, enclosed, imprisoned in this three-dimensional network.

The electrodes manufactured with the binder according to the invention are flexible without plasticizer addition (thereby making possible coiling operations easier), resistant and perfectly adherent to the current collectors without it being necessary to add an adhesion promoter. In addition, the electrodes have excellent electrochemical properties. No corrosion phenomenon is observed and the polymers employed are non-toxic and inexpensive.

Another advantage of the binder according to the invention is that it can be used to manufacture all kinds of electrodes, namely both anodes and cathodes, without modifying the production conditions and without adding an additional constituent in the case of the cathode.

Firstly, the binder according to the invention therefore comprises a first polymer having functional groups capable of reacting with a crosslinking agent.

Said functional groups may be chosen from hydroxyl functional groups, amide functional groups, carboxylic acid functional groups and esters thereof.

Preferably, the first polymer is a hydroxylated, preferably highly hydroxylated, polymer which may have an ester number as mentioned above, so that it can have a strong polar component thus guaranteeing a high surface energy close to 50 mJ/m$^2$, so as to ensure good adhesion to the current collector and good transfer properties on, for example, a printing device, preferably on a flexographic printing device.

Thus, the first polymer may be a hydroxylated polymer soluble in organic medium, whether said polymer is crosslinked or not (this does not mean the subsequent crosslinking with the crosslinking agent for forming the three-dimensional network), and capable of being obtained by hydrolysis of a non-hydroxylated polymer miscible with the fluoropolymers.

This hydroxylated polymer may be chosen from polyvinyl alcohols (PVAs), vinyl alcohol/vinyl acetate (PVA-co-PVAc) copolymers and blends thereof.

Preferably, the PVA-co-PVAC copolymers have a degree of hydrolysis of 5% or higher, preferably from 5 to 99% and more preferably from 5 to 95%, i.e. a PVA content (in mol %) of 5% or higher, preferably 5 to 99% and more preferably 5 to 95%. The maximum PVA content will preferably be equal to or less than 95%, more preferably less than 95%; so as to retain a residual PVAc part since PVAc is miscible with the second fluoropolymer and its presence prevents excessively rapid demixing, namely separation of the two polymers in the prepared blend prior to crosslinking.

PVA-co-PVAc copolymers generally have a weight-average molecular weight of 5000 to 600 000 g/mol.

The crosslinking agent is generally chosen from dialdehyde compounds, in particular in the case when the functional groups of the first polymer capable of reacting with the crosslinking agent are hydroxyl functional groups.

These dialdehyde compounds may be chosen from: aliphatic dialdehydes, such as ethanedial (glyoxal) and glutaraldehyde; and aromatic dialdehydes, such as o-phthalaldehyde (phthalaldehyde), m-phthalaldehyde (isophthalaldehyde), p-phthalaldehyde (terephthalaldehyde), 2,6-pyridinedicarbaldehyde and 2,5-thiophenedicarbaldehyde.

The binder generally comprises from 2 to 5% by weight of a crosslinking agent relative to the weight of the first polymer.

The structure of the first polymer, when it is a PVA-co-PVAc, after crosslinking with a crosslinking agent of the abovementioned dialdehyde compounds, satisfies the following formula:

in which R represents:

where n is an integer from 0 (for ethanedial) to 10 for example 1, 2, 3, 4, 5, 6, 7, 8 or 9.

Preferably, n=0, since ethanedial is the most reactive of the dialdehydes mentioned, thereby enabling crosslinking to take place very rapidly at temperatures between 20 and 50° C. In addition, ethanedial has a boiling point of 50° C., thereby ensuring that, after the 80° C. drying step, there is no unreacted residual ethanedial in the final electrode.

The second polymer may be chosen from vinylidene fluoride polymers (PVDFs), vinylidene fluoride copolymers, for example with hexafluoropropylene: namely poly(vinylidene fluoride/hexafluoropropylene)s (PVDF-HFP) and blends thereof.

The binder according to the invention generally comprises from 10 to 90% by weight of the first polymer and from 10 to 90% by weight of the second polymer relative to the total weight of the binder.

The invention furthermore relates to an electrode for an electrochemical system having a non-aqueous electrolyte, comprising a binder as described above, a positive or negative electrode electrochemically active material, optionally one or more electronically conductive additives, and a current collector.

In particular, this electrode may be a positive electrode of a rechargeable electrochemical accumulator having a non-aqueous electrolyte.

In such a positive electrode, the electrochemically active material may be chosen from: $LiCoO_2$; compounds derived from $LiCoO_2$, these being obtained by substitution preferably with Al, Ti, Mg, Ni and Mn, for example $LiAl_xNi_yCo_{(1-x-y)}O_2$ where x<0.5 and y<1 and $LiNi_xMn_xCo_{1-2x}O_2$; $LiMn_2O_4$; $LiNiO_2$; compounds derived from $LiMn_2O_4$, these being obtained by substitution preferably with Al, Ni and Co; $LiMnO_2$; compounds derived from $LiMnO_2$, these being obtained by substitution preferably with Al, Ni, Co, Fe, Cr and Cu, for example $LiNi_{0.5}O_2$; olivines $LiFePO_4$, $Li_2FeSiO_4$, $LiMnPO_4$ and $LiCoPO_4$; hydrated or non-hydrated iron phosphates and sulphates; $LiFe_2(PO_4)_3$; hydrated or non-hydrated vanadyl phosphates and sulphates, for example $VOSO_4.nH_2O$ and $Li_xVOPO_4.nH_2O$ (0<x<3 and 0<n<2); $Li_{(1+x)}V_3O_8$ (0<x<4); $Li_xV_2O_5.nH_2O$ (0<x<3 and 0<n<2); and mixtures thereof.

Said electrode may also be a negative electrode of a rechargeable electrochemical accumulator having a non-aqueous electrolyte.

In such a negative electrode, the electrochemically active material may be chosen from: carbon-based compounds such as natural or synthetic graphites and disordered carbons; lithium alloys of the $Li_xM$ type where M=Sn, Sb or Si; $Li_xCu_6Sn_5$ compounds where 0<x<13; iron borates; reversibly decomposable simple oxides, for example $CoO$, $Co_2O_3$, $Fe_2O_3$; pnicures, for example $Li_{(3-x-y)}Co_yN$, $Li_{(3-x-y)}Fe_yN$, $Li_xMnP_4$, $Li_xFeP_2$ and $Li_xFeSb_2$; insertion oxides such as titanates, for example $TiO_2$, $Li_4Ti_5O_{12}$, $Li_xNiP_2$, $Li_xNiP_3$, $MoO_3$ and $WO_3$; and mixtures thereof, or any material known to the man skilled in the art in this technical field.

The optional electronic conductive additive may be chosen from: metal particles, such as Ag particles; graphite; carbon black; carbon fibres; carbon nanowires and carbon nanotubes; and electronically conductive polymers and mixtures thereof.

The invention also relates to an electrochemical system having a non-aqueous electrolyte, which comprises at least one electrode as described above.

In particular, the electrochemical system may be a rechargeable electrochemical accumulator having a non-aqueous electrolyte comprising a positive electrode as described above, a negative electrode as described above and a non-aqueous electrolyte.

This electrolyte may be solid or liquid.

When the electrolyte is liquid, it consists for example of a solution of at least one conducting salt, such as a lithium salt in an organic solvent.

When the electrolyte is solid, it comprises a polymer material and a lithium salt.

The lithium salt may be chosen for example from: $LiAsF_6$; $LiClO_4$; $LiBF_4$; $LiPF_6$; LiBOB; LiODBF; $LiB(C_6H_5)$; $LiCF_3SO_3$; $LiN(CF_3SO_2)_2$ (LiTFSI); and $LiC(CF_3SO_2)_3$ (LiTFSM).

Preferably, the organic solvent is a solvent which is compatible with the constituents of the electrodes, is relatively non-volatile, is aprotic and is relatively polar. For example, ethers, esters and mixtures thereof may be mentioned.

The ethers are in particular chosen from: linear carbonates, such as dimethyl carbonate (DMC), diethyl carbonate (DEC), methylethyl carbonate (EMC) and dipropyl carbonate (DPC); cyclic carbonates, such as propylene carbonate (PC), ethylene carbonate (EC) and butylene carbonate; alkyl esters, such as formates, acetates, propionates and butyrates; γ-butyrolactone; triglyme; tetraglyme; lactones; dimethylsulphoxide; dioxolane; sulpholane and mixtures thereof. The solvents are preferably mixtures including EC/DMC, EC/DEC, EC/DPC and EC/DMC.

The accumulator may in particular have the form of a button cell.

Figure 1:
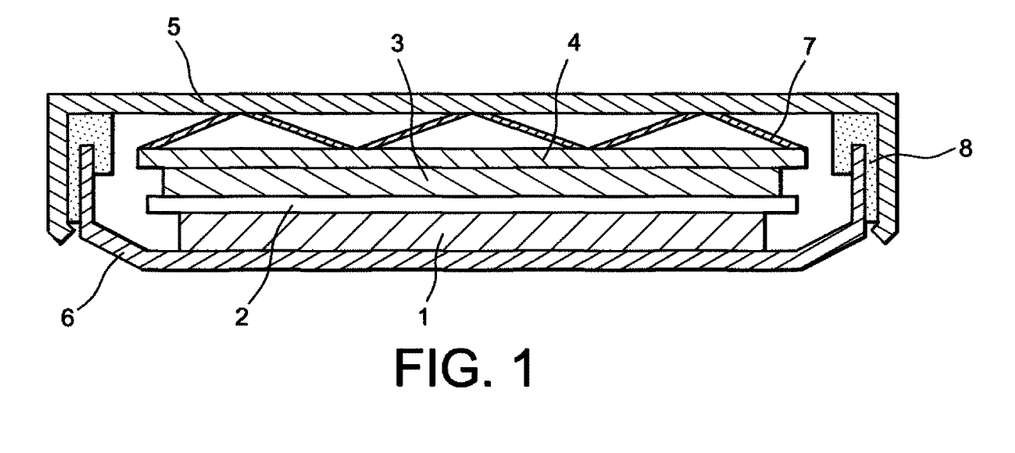
FIG. 1 is a schematic view in vertical cross section of an accumulator in the form of a button cell comprising an electrode, for example an electrode to be tested according to the invention or according to the prior art, such as the electrodes prepared in Examples 1 to 4.

The various elements of a button cell, made of 316L stainless steel, are described in FIG. 1.

These elements are the following:
the top (5) and bottom (6) of the stainless steel case;
the polypropylene seal (8);
the stainless steel inserts (4), which serve both for cutting the lithium metal and then, later on, for ensuring good contact of the current collectors with the external portions of the cell;
a spring (7), which ensures contact between all the elements;
a microporous separator (2); and
electrodes (1) and (3).

The invention also relates to a method of preparing an electrode as described above, in which:
a pulverulent mixture of active electrode material and optionally one or more electronically conductive additives is prepared;
a first solution in a first solvent of a first polymer, having functional groups capable of reacting with a crosslinking agent, and a second solution in a second solvent of a second polymer chosen from fluoropolymers are prepared;
the first and second solutions are mixed and stirred so as to obtain a homogeneous mixture of the two solutions;
a crosslinking agent is added to the homogeneous mixture of the two polymer solutions;
the pulverulent mixture of active electrode material and optionally one or more electronically conductive additives is added to the homogeneous mixture of the two polymer solutions and the crosslinking agent, followed by stirring so as to obtain a homogeneous mixture called an ink or paste;
said ink or paste is coated, deposited or printed using a printing device, on a current collector;
the ink or paste deposited is dried; and
the dried ink or paste deposited and the current collector are calendered, pressed.

In general, the ink is applied (coated) by a process chosen from coating, gravure printing, laminating, photogravure, offset printing, screen printing and ink-jet printing.

The crosslinking, namely the reaction between the first polymer and the crosslinking agent, generally takes place, according to the invention, during the step of drying the ink or paste.

Finally, the invention relates to a paste or ink comprising, in a solvent, from 70 to 90% by weight of active material as defined above, optionally from 1 to 15% of one or more electronically conductive additives and from 1 to 20%, preferably 1 to 10%, by weight of the binder according to the invention as described above, these percentages being expressed relative to the solids content (dry extract).

The solids content of the ink defined by its dry extract is generally from 20 to 80% by weight.

The invention will now be described in greater detail in the following description, given by way of non-limiting illustration and with reference to the appended drawings in which.

Figure 2:
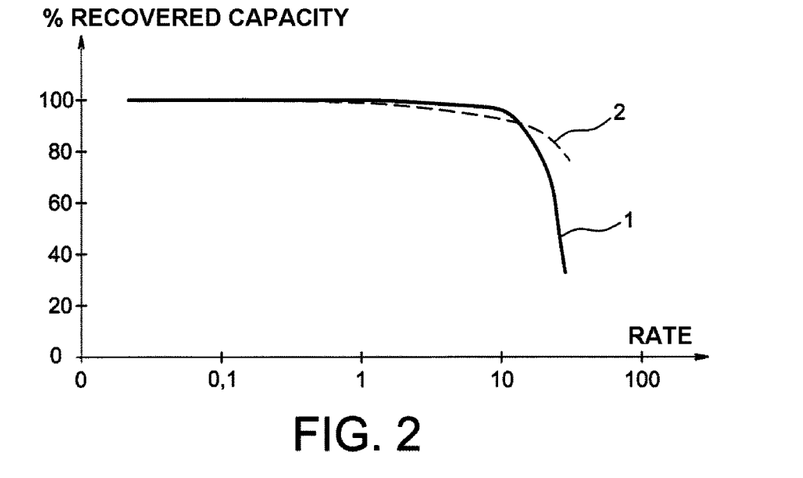
FIGS. 2 and 3 show the restored or recovered discharge capacity (expressed as a percentage of the theoretical capacity achievable) as a function of the discharge rate possibly going from D/50 to 30D, knowing that a rate of D corresponds to a discharge in one hour, of the electrodes prepared in Examples 1 to 4.

In FIG. 2, curves ② and ① show, respectively, the performance of a positive electrode manufactured according to the example with a binder of the present invention compared with an electrode produced according to Example 1 with a conventional PVDF binder according to the prior art.

Figure 3:
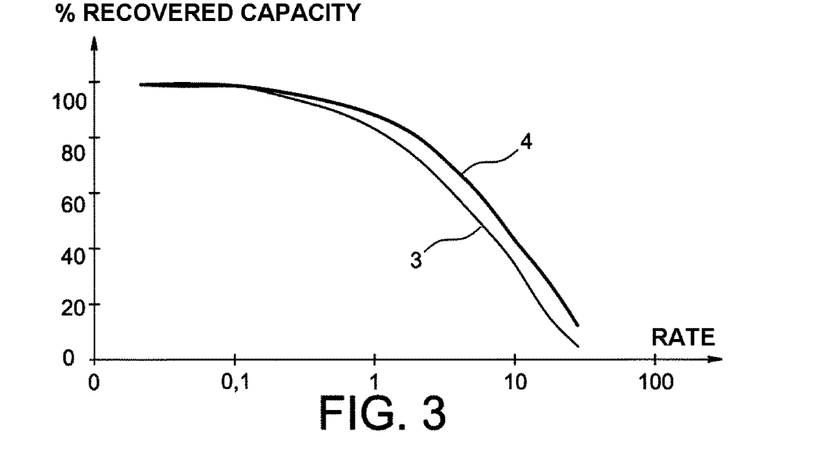

In FIG. 3, curves ④ and ③ show, respectively, the performance of a negative electrode manufactured according to Example 4 with the binder of the present invention compared with an electrode according to Example 3 produced with a conventional PVDF binder according to the prior art.

This description refers more particularly to an embodiment in which an electrode comprising a binder in which the first polymer is a hydroxylated polymer, such as a PVA or a PVA-co-PVAc, and the crosslinking agent is a dialdehyde, is manufactured, but the following description could easily be extended to any polymer and to any crosslinking agent.

The first step during the manufacture or production of a positive or negative electrode consists in intimately blending the active material and the optional materials, namely electronically conductive additives.

The active anode or cathode material as described above and one or more electronically conductive additives as mentioned above are therefore weighed beforehand and then placed in a milling device, such as a manual milling bowl or mortar.

A small amount of diluent such as hexane may be added to the powder blend in order to make milling easier.

The milling is continued for the time necessary, for example 15 to 20 minutes, for obtaining an intimate blend of all the constituents. The term "intimate blend" is understood for example to mean that there is no segregation.

The diluent such as hexane is then evaporated from the powder blend, for example by placing it in an oven at a temperature of generally 50 to 80° C., for example 55° C.

It has been noted that the present invention is particularly based on the fact that it is possible to stabilize a polymer blend containing a fluoropolymer such as PVDF, or one of its derivatives such as PVDF-HFP, with a hydroxylated polymer. Before the crosslinking, two polymers are therefore blended in solution so that polymer separation can take place at rest only after several hours, for example after 1 to 2 hours.

Thus, for this separation or demixing phenomenon not to occur too soon (for example in less than one hour), a first polymer (P1), for example a hydroxylated polymer, preferably a PVA-co-PVAc, and a second polymer (P2), namely a fluoropolymer, preferably a PVDF, both of high molecular weight, are preferably used, and vigorously mixed.

By dissolving long macromolecular chains in the common solvent, preferably N-methylpyrrolidone, a polymer blend of high viscosity, for example close to 1 Pa·s, is consequently formed.

Entanglements are thus more difficult to be undone by reptation of the macromolecular chains, and the blend may be stabilized by the addition of the crosslinking agent for the polymer P1 before demixing takes place. In the liquid state, i.e. in the system consisting of polymers P1 and P2+solvent, for example NMP+crosslinking agent, hydrogen bonds are established between the crosslinking agent and the hydroxyl functional groups carried by the polymer P1 and a PVA-co-PVAc gel is formed. The covalent bonds will be created subsequently during the drying due to the removal of water molecules.

The first polymer forming the three-dimensional network, after it has been crosslinked is for example a poly(vinyl acetate)-co-poly(vinyl alcohol) or any other hydroxylated polymer soluble in organic medium, whether crosslinked or not, and the non-hydroxylated derivative of which, i.e. the derivative from which the hydroxylated polymer is prepared by hydrolysis reaction, is miscible with the fluoropolymers of PVDF or PVDF-HFP type for example.

The PVA-co-PVAc copolymers employed according to the invention generally have a degree of hydrolysis equal to or greater than 5% (i.e. they contain at least 5 mol % of polyvinyl alcohol, for example 5 to 99 mol %, and they have a weight-average molar weight of between 5000 g/mol and several hundred thousand g/mol, for example 600 000 g/mol.

A completely (99%) hydrolysed PVA always contains residual acetate functional groups. The following scheme illustrates the hydrolysis reaction in which the acetate functional groups are hydrolysed to hydroxyl functional groups:

The second polymer is a fluoropolymer, which may be polyvinylidene fluoride (PVDF) or one of its derivatives, such as for example poly(vinylidene fluoride-co-hexafluoropropylene) (PVDF-HFP).

The first, for example hydroxylated, polymer (P1) and the second polymer, namely the fluoropolymer (P2), must be soluble in an amount of 2 to 30% by weight in a common solvent.

The concentration is chosen according to the molecular (molar) weight of each of the polymers since the higher the molecular weight the lower the maximum concentration by weight of a given polymer in the common solvent becomes—beyond this concentration, gelling occurs.

Preferably, the solvent used is N-methyl-2-pyrrolidone. Preferably, a PVDF having a molar weight of 160 000 g/mol will dissolve up to 12% in N-methylpyrrolidone, whereas a PVA-co-PVAc with a molar weight of 250 000 g/mol will dissolve up to 5% in the same solvent, so that the two solutions S1 and S2 have close viscosities.

The pure (non-hydrolysed) PVAc is perfectly miscible with the fluoropolymers of type P2. The higher the degree of hydrolysis of the PVA-co-PVAc (i.e. the more the PVA part in the PVA-PVAc copolymer increases), the more the compatibility with the fluoropolymers of type P2 decreases.

The almost complete hydrolysis of the PVA-co-PVAc to PVA results in a polymer immiscible with the polymers of type P2 and rapid demixing is observed when both polymers are present.

To produce an intimate blend of the two polymers P1 and P2, the crosslinking reaction predominantly taking place during the drying step, starting polymer solutions having close viscosities, for example 1 Pa·s, should preferably be used.

Preferably, and so as to avoid excessively rapid demixing (separation of the two polymers), it is preferable to use a PVA-co-PVAc having a maximum PVA content of less than 95% so as to retain a residual PVAc part miscible with the second polymer, namely the fluoropolymer.

The fluoropolymers of type P2 have a surface tension equal to or less than 23 mN/m. The completely hydrolysed PVA polymer P1 has a surface tension close to 60 mN/m. To be able to be used on a printing system, the ink must have a surface tension between 35 and 40 mN/m. To compensate for the low surface tension of the polymer of type P2, it is important that the content of polymer P1 and, in the mixture, the binder be high, the content of polymer P1 generally being from 40 to 80%, preferably close to 50%, by weight and the content of polymer P2 (the fluoropolymer) therefore generally being from 20 to 60%, preferably 50%, by weight.

The solution S1 of polymer P1 in a solvent such as N-methylpyrrolidone and the solution of polymer P2, preferably in the same solvent, these two solutions having close viscosities are mixed in the desired proportions, for example using a mechanical shearing stirrer for the necessary time, for example, 10 to 30 minutes, especially 30 minutes, to obtain a homogeneous mixture.

Next, the desired amount of crosslinking agent is added to this homogeneous mixture of solutions S1 and S2, and stirring is then carried out in an apparatus in accordance with the one mentioned above for the necessary time, for example 2 to 10 minutes, especially 5 minutes, for obtaining a homogeneous mixture.

Once the weight-average molecular weight and the degree of hydrolysis of the PVA-co-PVAc have been chosen, for example 250 000 g/mol and 95% hydrolysis, as indicated above, the crosslinking agent that reacts with the hydroxyl functional groups is added in excess so that all the hydroxyl functional groups are consumed during the crosslinking that takes place during the drying step.

Thus, to consume all the hydroxyl functional groups of a polymer P1, for example a PVA-co-PVAc of 250 000 g/mol weight-average molecular weight and 95% hydrolysis, it is necessary to add about 2% of crosslinking agent, for example ethanedial, to the mixture relative to the mass of polymer P1 introduced into the mixture.

In general, the amount of added crosslinking agent represents from 2 to 5 wt %, preferably 2 wt %, relative to the weight of polymer P1.

The addition of the crosslinking agent into the medium creates hydrogen bonds between the hydroxyl functional groups of the polymer P1 and the aldehyde functional groups of the crosslinking agent. The coupling reaction will take place mainly, and even only, during the drying step, while water molecules will be formed and removed by condensation. The viscoelastic properties of the polymers present are checked beforehand using a cone/plate rheometer.

The powder blend of the active material and optionally of the electronically conductive materials, prepared as described above, is then added to the mixture of solutions S1 and S2 containing the crosslinking agent. The whole is stirred, for example in an apparatus similar to that already used above, for a time generally of 10 to 30 minutes, for example 30 minutes.

During this operation, it is necessary for the viscosity not to be too high, since the resulting increase in temperature could cause the ink or paste to crosslink in the container—the mixing pot. The viscosity may for example be checked by discrete addition of solvent.

For example, glyoxal can react with the hydroxyl functional groups of the PVA units of a PVA-co-PVAc copolymer at a temperature close to 35° C. If the mixture is very viscous, the impellers of the mixer will rapidly cause the temperature within the mixture to rise and the glyoxal will be liable to partly react before the drying.

This effect may be avoided for example by using a thermostatted pot so as to control the temperature and by reducing the stirring speed. Even if the glyoxal does not react, it is liable to form hydrogen bonds.

By a judicious choice of crosslinking agent and its relative proportion in the mixture, the surface tension, the viscosity and the rheological properties of the ink may be easily controlled and adjusted so that said ink can be used in any transfer or printing equipment, namely for coating, gravure printing, laminating, photogravure, offset printing, screen printing, ink-jet printing, etc.

The ink or paste obtained generally contains 70 to 95 wt %, for example 70 wt %, of active material, optionally 1 to 15 wt % of one or more electronically conductive additives and 1 to 20 wt %, preferably 1 to 10 wt % of the binder of the invention.

The percentages expressed above are expressed relative to the solids content of the ink, defined by its dry extract (non volatile matter) ("extrait sec") which is generally 20 to 80% by weight (i.e. the solid matter remaining after drying relative to the total weight before drying and evaporation of the solvent). The ink also contains a certain amount of solvent so as to give it the desired consistency.

The ink thus produced is then coated or deposited on a current collector, which may be an aluminium sheet or foil in the case of a cathode and a copper, nickel or aluminium sheet or foil in the case of an anode.

The ink or paste deposited is then dried, generally under the following conditions: 55° C. for around twelve hours. Before being used, the electrodes are redried at 80° C. in a vacuum for 24 hours.

During this drying, following the step of printing or coating the electrode with ink, some of the crosslinkable functional groups, for example the hydroxyl functional groups of the polymer P1, react with the crosslinking agent, for example one of the dialdehyde family, so as to create a three-dimensional network in which the fluoropolymer P2 is imprisoned, entangled. Thanks to this structure, the blend of the two polymers remains stable and no demixing is observed during the drying step.

The invention will now be described with reference to the following examples given by way of non-limiting illustration:

EXAMPLES

In Examples 1 to 4 that follow, electrodes comprising a binder according to the invention (Examples 2 and 4) or a conventional binder of the prior art (Comparative Examples 1 and 3) were prepared.

Comparative Example 1

In this example, an electrode comprising a binder not in accordance with the invention, namely polyvinylidene fluoride (PVDF), was prepared.

The binder content in the final electrode was 6% by weight.

A 12% PVDF solution in N-methylpyrrolidone (NMP) was prepared by dissolving 6 g of PVDF in 44 g of NMP.

82 g of $LiCoO_2$, preblended and then milled, in hexane with 6 g of carbon and 6 g of graphite (electronically conductive additives) were progressively added to this solution.

The ink obtained was coated on an aluminium foil and the electrode was then vacuum-dried at 80° C. before being compressed so as to obtain a porosity of between 30 and 40%.

Example 2

In this example, an electrode comprising a binder according to the invention, namely polyvinylidene fluoride (PVDF) with poly(vinyl alcohol)-co-poly(vinyl acetate) (PVA-co-PVAc), crosslinked with 2% by weight of ethanedial relative to the weight of PVA-co-PVAc was prepared.

The overall binder content in the final electrode was 6% by weight.

A 12% PVDF solution in N-methylpyrrolidone (NMP) was prepared by dissolving 3 g of PVDF in 22 g of NMP and then mixed with a PVA-co-PVAc solution prepared by dissolving 3 g of PVA-co-PVAc in 60 g of NMP.

82 g of $LiCoO_2$, mixed beforehand and then milled, in hexane, with 6 g of carbon and 6 g of graphite (electronically conductive additives), were progressively added to this solution.

Next, 0.06 g of ethanedial was added to the mixture with stirring.

The ink obtained was coated on an aluminium foil and the electrode was then vacuum-dried at 80° C. before being compressed so as to obtain a porosity of between 30 and 40%.

Comparative Example 3

In this example, an electrode comprising a binder not in accordance with the invention, made of polyvinylidene fluoride (PVDF), was prepared.

The binder content in the final electrode was 6% by weight.

A 12% PVDF solution in N-methylpyrrolidone (NMP) was prepared by dissolving 6 g of PVDF in 44 g of NMP.

82 g of $Li_4Ti_5O_{12}$, preblended and then milled in hexane with 6 g of carbon and 6 g of graphite (electronically conductive additives), were progressively added to this solution.

The ink obtained was coated on an aluminium foil and then the electrode was vacuum-dried at 80° C. before being compressed so as to obtain a porosity of between 40 and 60%.

Example 4

In this example, an electrode comprising a binder according to the invention, made of polyvinylidene fluoride (PVDF) with poly(vinyl alcohol)-co-poly(vinyl acetate) (PVA-co-PVAc) crosslinked with 2% by weight of ethanedial relative to the weight of PVA-co-PVAc was prepared.

The overall binder content in the final electrode was 6% by weight.

A 12% PVDF solution in N-methylpyrrolidone (NMP) was prepared by dissolving 3 g of PVDF in 22 g of NMP and then mixed with a PVA-co-PVAc solution prepared by dissolving 3 g of PVA-co-PVAc in 60 g of NMP.

82 g of $LiCoO_2$, preblended and then milled in hexane with 6 g of carbon and 6 g of graphite (electronically conductive additives) were progressively added to this solution.

Next, 0.06 g of ethanedial were added to the mixture with stirring.

The ink obtained was then coated on an aluminium foil and the electrode was then vacuum-dried at 80° C. before being compressed so as to obtain a porosity of between 30 and 40%.

All the prepared electrodes cited above in Examples 1 to 4 were electrochemically tested as a cell in button cell format.

Before being tested in button cell format, the electrodes prepared in Examples 1 to 4 were vacuum-dried at 80° C. for 24 hours before being introduced into a glove box for mounting the accumulators.

Each button cell was then mounted by scrupulously respecting the same protocol. Thus, the following were stacked, from the bottom of the case of the cell, as shown in FIG. 1:

the electrode (1) to be tested, of 14 mm diameter;
200 µl of electrolyte, namely 1 mol/liter of $LiPF_6$ in a 1/1 EC/DMC mixture;
a microporous Celgard© polypropylene separator (2) of 16.5 mm in diameter;
a lithium disk (3) of 16 mm in diameter or another type of electrode, chosen from the conventional materials that have been used in the prior art for a positive or negative electrode in non-aqueous medium;
a stainless steel disk or spacer (4);
a stainless steel lid (5) and a stainless steel bottom (6); and
a stainless steel spring (7) and a polypropylene seal (8).

The stainless steel case was then sealed using a crimper, making it perfectly airtight. To verify whether the cells were operational, they were checked by measuring the floating voltage ("tension à l'abandon").

Because of the high reactivity of lithium and its salts to oxygen and water, the button cells were put together in a glove box. This was kept under a slight overpressure in an anhydrous argon atmosphere. Sensors enabled the oxygen concentration and water concentration to be continually monitored. Typically, these concentrations had to remain less than 1 ppm.

A counter-electrode, made of lithium metal or another type of electrode, chosen from conventional materials used in the prior art for a positive or negative electrode in a non-aqueous medium was used, facing the electrode of composition described in the various examples. The electrolyte contained $LiPF_6$ comprising 1 mol per liter in a 1:1 EC/DMC mixture.

The electrodes prepared in Examples 1 to 4 and mounted in button cells in accordance with the procedure described above underwent cycling at 140 mAh/g of $LiCoO_2$ when the electrode was a positive electrode (Examples 1 and 2) and at 160 mAh/g of $Li_4Ti_5O_{12}$ when the electrode was a negative electrode (Examples 3 and 4).

The cycling results are given in FIGS. 2 and 3.

Curve 1 in FIG. 2 shows the cycling result obtained on 0.6 mAh/cm² electrodes prepared according to Example 1 and having, after compression, a porosity of 30%. The calculated theoretical total capacity for 140 mAh/g of materials was recovered at D/50. The electrode may restore up to 33% of its capacity at 30D, i.e. in two minutes.

Curve 2 in FIG. 2 shows the cycling result obtained on 0.6 mAh/cm² electrodes prepared according to Example 2 and having, after compression, a porosity of 35%. The calculated theoretical total capacity for 140 mAh/g of materials was recovered at D/50. The electrode may restore up to 80% of its capacity at 30D, i.e. in two minutes.

Curve 3 in FIG. 3 shows the cycling result obtained on electrodes prepared according to Example 3 and having, after compression, a porosity of 30%. The calculated theoretical total capacity for 160 mAh/g of materials was recovered at D/50. The electrode may restore up to 5.3% of its capacity at 30D, i.e. in two minutes.

Curve 4 in FIG. 3 shows the cycling result obtained on 0.6 mAh/cm² electrodes prepared according to Example 4 and having, after compression, a porosity of 35%. The calculated theoretical total capacity for 140 mAh/g of materials was recovered at D/50. The electrode may restore up to 13.5% of its capacity at 30D, i.e. in two minutes.

The tests carried out show the superior results obtained with the electrodes according to the invention prepared with the specific binder according to the invention.

The invention claimed is:

1. Binder for an electrode of an electrochemical system having a non-aqueous electrolyte, said binder comprising a first polymer having functional groups bonded with a crosslinking agent, and the first polymer is crosslinked with the crosslinking agent, the crosslinked first polymer forming a three-dimensional network in which a second polymer chosen from fluoropolymers is imprisoned, wherein the binder comprises 2 to 5% by weight of the crosslinking agent relative to the weight of the first polymer, and wherein the first polymer is different from the second polymer.

2. Binder according to claim 1, in which said functional groups bonded with a crosslinking agent are chosen from hydroxyl functional groups, amide functional groups, carboxylic acid functional groups and esters thereof.

3. Binder according to claim 2, in which the first polymer is a hydroxylated polymer soluble in organic medium, whether said polymer is crosslinked or not, and capable of being obtained by hydrolysis of a non-hydroxylated polymer miscible with the fluoropolymers.

4. Binder according to claim 3, in which said hydroxylated polymer is chosen from polyvinyl alcohols (PVAs), vinyl alcohol/vinyl acetate (PVA-co-PVAc) copolymers, and blends thereof.

5. Binder according to claim 4, in which the PVA-co-PVAC copolymers have a degree of hydrolysis of 5% to 99%.

6. Binder according to claim 4, in which the PVA-co-PVAC has a weight-average molecular weight of 5000 to 600 000 g/mol.

7. Binder according to claim 1, in which the crosslinking agent is chosen from dialdehyde compounds.

8. Binder according to claim 7, in which the crosslinking agent is chosen from: aliphatic dialdehydes and aromatic dialdehydes.

9. Binder according to claim 8, in which the first polymer is a PVA-co-PVAC and the polymer crosslinked with the crosslinking agent satisfies the following formula:

in which R represents:

where n is an integer from 0 to 10.

10. Binder according to claim 1, in which the second polymer is chosen from vinylidene fluoride polymers (PVDFs), vinylidene fluoride copolymers and blends thereof.

11. Binder according to claim 1, comprising from 10 to 90% by weight of the first polymer and from 10 to 90% by weight of the second polymer relative to the total weight of the binder.

12. Electrode for an electrochemical system having a non-aqueous electrolyte, comprising a binder according to claim 1, an electrochemically active material, optionally one or more electronically conductive additives and a current collector.

13. Electrode according to claim 12, which is a positive electrode of a rechargeable electrochemical accumulator having a non-aqueous electrolyte.

14. Electrode according to claim 13, in which the electrochemically active material is chosen from: $LiCoO_2$; compounds derived from $LiCoO_2$, these being obtained by substitution $LiMn_2O_4$; $LiNiO_2$; compounds derived from $LiMn_2O_4$, these being obtained by substitution $LiMnO_2$; compounds derived from $LiMnO_2$, these being obtained by substitution olivines LiFePO$_4$, Li$_2$FeSiO$_4$, LiMnPO$_4$ and LiCoPO$_4$; hydrated or non-hydrated iron phosphates and sulphates; LiFe$_2$(PO$_4$)$_3$;

hydrated or non-hydrated vanadyl phosphates and sulphates Li$_{1+x}$V$_3$O$_8$ (0<x<4); Li$_x$V$_2$O$_5$·nH$_2$O (0<x<3 and 0<n<2); and mixtures thereof.

15. Electrode according to claim 12, which is a negative electrode of a rechargeable electrochemical accumulator having a non-aqueous electrolyte.

16. Electrode according to claim 15, in which the electrochemically active material is chosen from: carbon-based compounds; lithium alloys of the Li$_x$M type where M=Sn, Sb or Si; Li$_x$Cu$_6$Sn$_5$ compounds where 0<x<13; iron borates; reversibly decomposable simple oxides; pnicures; insertion oxides; and mixtures thereof.

17. Electrode according to any one of claims 12 to 16, in which the electronically conductive additive is chosen from: metal particles; graphite; carbon black; carbon fibres; carbon nanowires and carbon nanotubes; and electronically conductive polymers and mixtures thereof.

18. Electrochemical system comprising at least one electrode according to claim 12.

19. Ink, comprising, in a solvent, from 70 to 90% by weight of active material, optionally from 1 to 15% by weight of one or more electronically conductive additives and from 1 to 20% by weight of the binder according to claim 1.

20. Binder according to claim 4, in which the PVA-co-PVAC copolymers have a degree of hydrolysis of 5% to 95%.

21. Binder according to claim 8, in which the aliphatic dialdehydes are chosen from ethanedial and glutaraldehyde.

22. Binder according to claim 8, in which the aromatic dialdehydes are chosen from ortho-phthalaldehyde, meta-phthalaldehyde, para-phthalaldehyde, 2,6-pyridinedicarbaldehyde and 2,5-thiophenedicarbaldehyde.

23. Binder according to claim 10, in which the vinylidene fluoride copolymers are chosen from poly(vinylidene fluoride/hexafluoropropylene) (PVDF-HFP).

24. Electrode according to claim 1, in which the compounds derived from LiCoO$_2$ are obtained by substitution with Al, Ti, Mg, Ni or Mn.

25. Electrode according to claim 24, in which the compounds derived from LiCoO$_2$ are LiAl$_x$Ni$_y$Co$_{(1-x-y)}$O$_2$ or LiNi$_x$Mn$_x$Co$_{1-2x}$O$_2$, where x <0.5 and y <1.

26. Electrode according to claim 1, in which the compounds derived from LiMn$_2$O$_4$ are obtained by substitution with Al, Ni or Co.

27. Electrode according to claim 14, in which the compounds derived from LiMnO$_2$ are obtained by substitution with Al, Ni, Co, Fe, Cr or Cu.

28. Electrode according to claim 27, in which the compound derived from LiMnO$_2$ is LiNi$_{0.5}$O$_2$.

29. Electrode according to claim 14, in which the hydrated or non-hydrated vanadyl phosphates and sulphates are VOSO$_4$·nH$_2$O or Li$_x$VOPO$_4$·nH$_2$O (0<x<3 and 0<n<2).

30. Electrode according to claim 16, in which the reversibly decomposable simple oxides are CoO, Co$_2$O$_3$ or Fe$_2$O$_3$.

31. Electrode according to claim 16, in which the pnicures are Li$_{(3-x-y)}$Co$_y$N, Li$_{(3-x-y)}$Fe$_y$N, Li$_x$MnP$_4$, Li$_x$FeP$_2$ or Li$_x$FeSb$_2$.

32. Electrode according to claim 16, in which the insertion oxides are TiO$_2$, Li$_4$Ti$_5$O$_{12}$, Li$_x$NiP$_2$, Li$_x$NiP$_3$, MoO$_3$ or WO$_3$.

33. Electrode according to claim 16, in which the carbon-based compounds are natural or synthetic graphites and disordered carbons.

34. Electrode according to claim 17, in which the metal particles are Ag particles.

* * * * *

UNITED STATES PATENT AND TRADEMARK OFFICE
CERTIFICATE OF CORRECTION

PATENT NO. : 9,673,480 B2
APPLICATION NO. : 12/526190
DATED : June 6, 2017
INVENTOR(S) : Franck Medlege et al.

It is certified that error appears in the above-identified patent and that said Letters Patent is hereby corrected as shown below:

In the Claims

Claim 26, Column 18, Line 10, "Electrode according to claim 1," should read --Electrode according to claim 14,--

Signed and Sealed this
Thirteenth Day of March, 2018

Andrei Iancu
*Director of the United States Patent and Trademark Office*